Jan. 4, 1938.  C. J. VAN BUREN  2,104,500
INSULATED BUILDING STRUCTURE
Filed Aug. 10, 1933  5 Sheets-Sheet 1

WITNESSES:—
A. M. Van Buren
R. M. Burgess

INVENTOR:—
Charles J. Van Buren

Jan. 4, 1938.　　　C. J. VAN BUREN　　　2,104,500
INSULATED BUILDING STRUCTURE
Filed Aug. 10, 1933　　　5 Sheets-Sheet 2
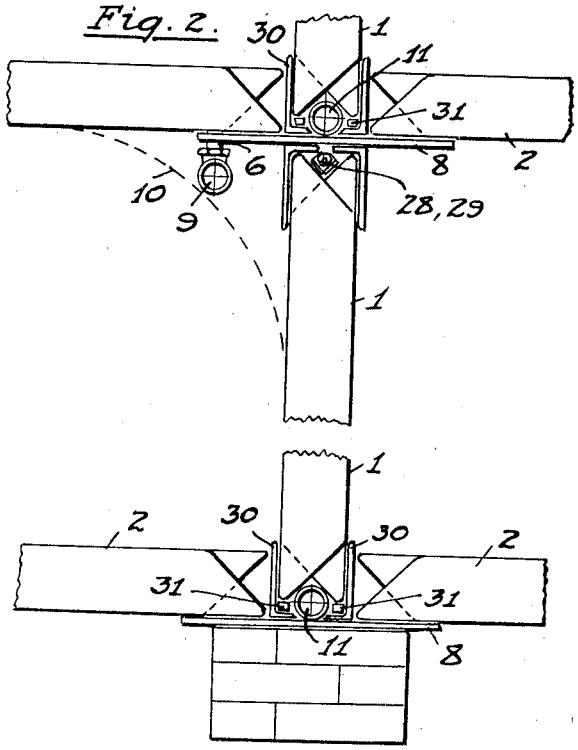
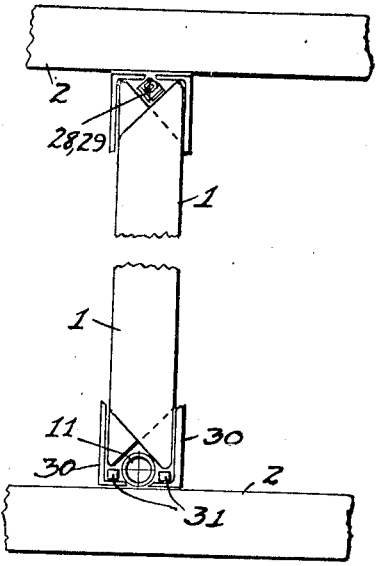
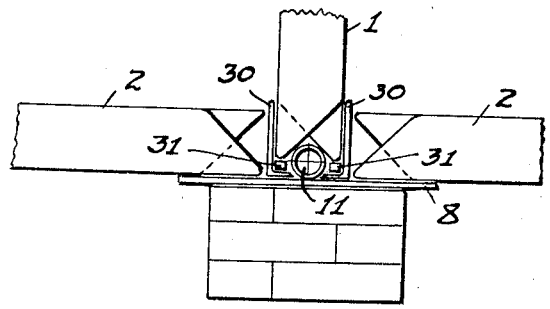
WITNESSES:—　　　INVENTOR:—
Charles J. Van Buren

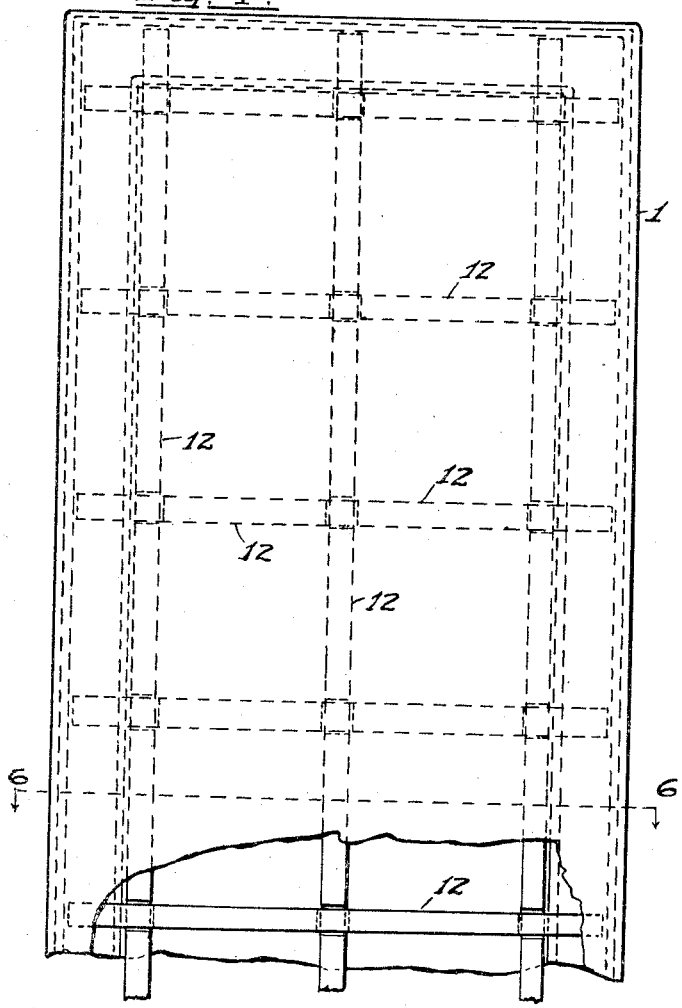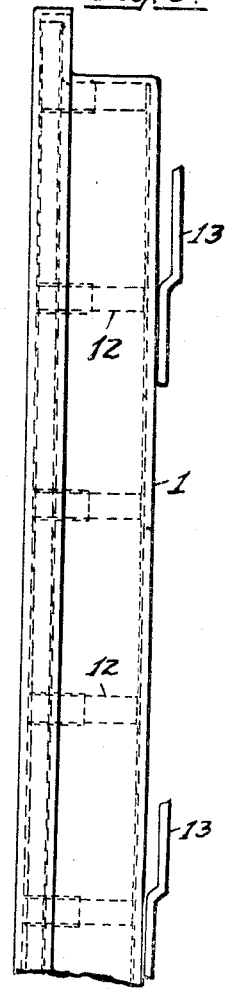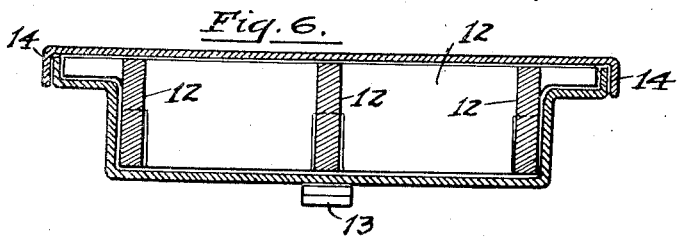

Jan. 4, 1938.　　　　C. J. VAN BUREN　　　　2,104,500
INSULATED BUILDING STRUCTURE
Filed Aug. 10, 1933　　　5 Sheets-Sheet 4
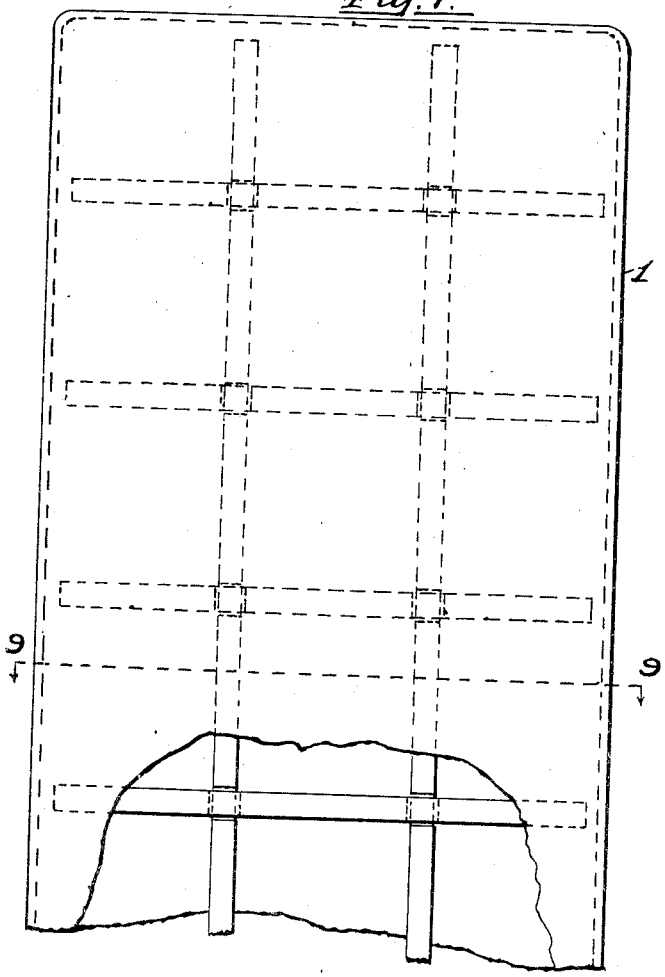
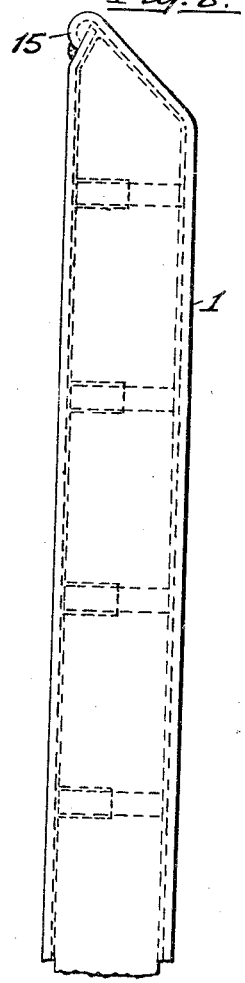
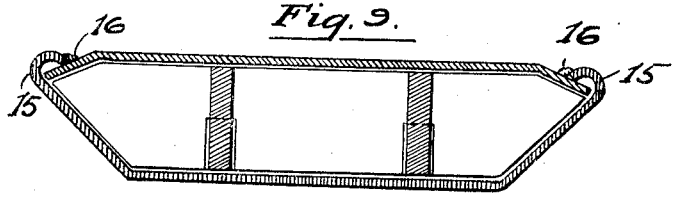
WITNESSES:—　　　　　　　　　　　　　INVENTOR:—

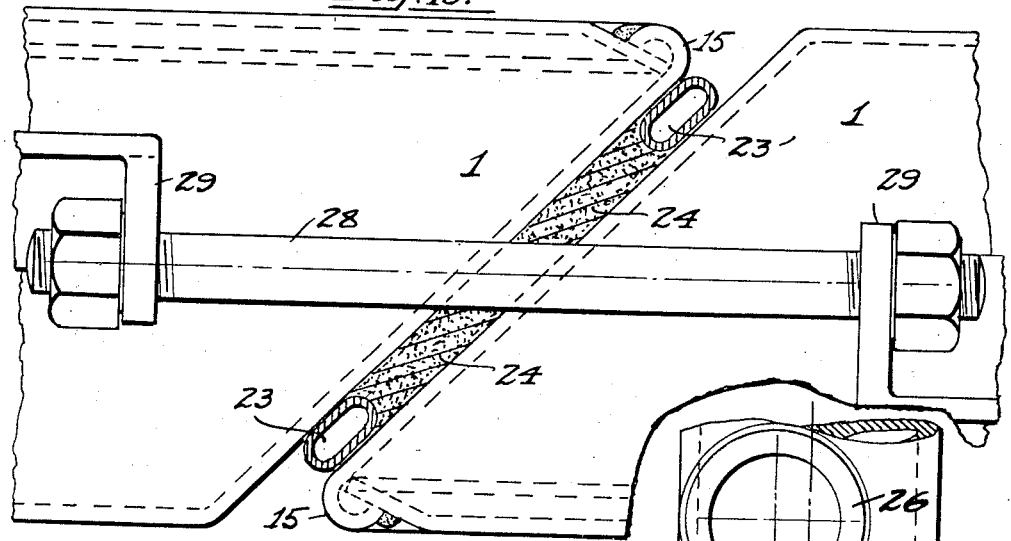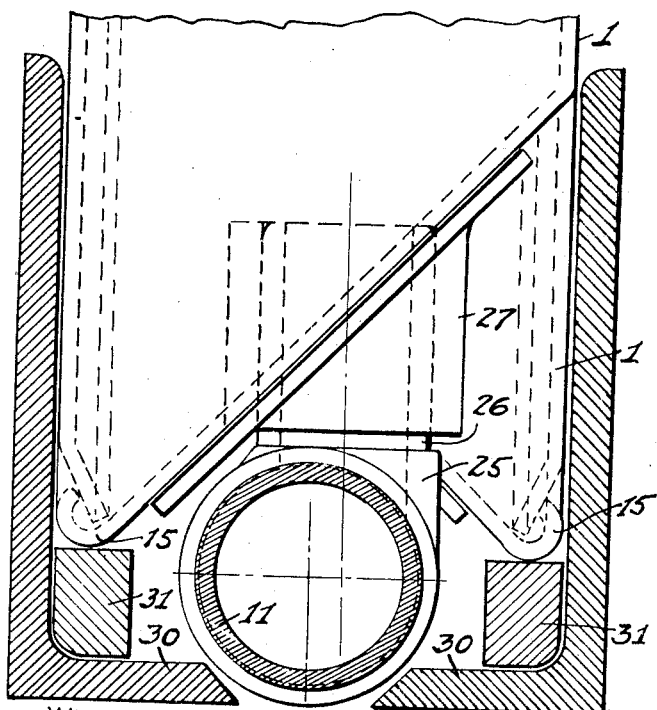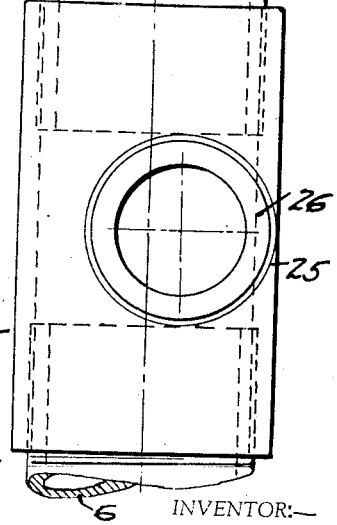

Patented Jan. 4, 1938

2,104,500

UNITED STATES PATENT OFFICE 2,104,500

INSULATED BUILDING STRUCTURE

Charles J. Van Buren, Detroit, Mich.

Application August 10, 1933, Serial No. 684,555

6 Claims. (Cl. 189—1)

My invention relates to insulated building structures, and its principal object is to provide means whereby buildings and other structures may be insulated against heat and cold, as well as being rendered practically sound-proof to a degree approaching totality.

A further object of my said invention is to provide a series of standard units for the purpose outlined which may be combined in various ways to form enclosed structures of different types, which structures in many cases may be made entirely self-supporting without the use of any supplementary framework.

The boon to surgical and nervous cases in hospitals will be incalculable, also taking care of the sick in one's own home, where all disturbing noises can be shut out, or having a den or study in which no outside noise can come to disturb or distract.

In designing this basic material, it has been my purpose to provide the architect and the builder with a material with which they could construct any building, which would be sound-proofed and insulated against heat or cold to a degree never before reached and at a cost actually lower than for some of the material now in use.

With these and other objects in view, the invention consists in the improved construction, arrangement, and combination of parts which will be hereinafter fully described, reference being had to the accompanying drawings, which illustrate a preferred embodiment thereof, in which drawings—

Figure 2 shows a fragmentary end section of a building in elevation, showing a portion of foundation with partition wall and floor members.

Figure 3 is a fragmentary end section of a partition wall introduced between two existing floor members, in which one floor member acts as the floor and the upper acts as the ceiling.

Figure 4 is a portion of a slab, shown in elevation, of the sort depicted in Figure 1, which also shows a grillage of separators.

Figure 5 is an edge view of Figure 4.

Figure 6 is a sectional view of Figure 4 on line 6—6 showing separators.

Figure 7 is a portion of a slab, shown in elevation, of the sort depicted in Figures 2 and 3, showing grillage of separators.

Figure 8 is an edge view of Figure 7.

Figure 9 is a sectional view of Figure 7 on line 9—9 showing separators and beaded joint.

Figure 10 is a fragmentary plan view of a portion of a wall, showing slabs of the sort depicted in Figures 2 and 3, showing, as well, the sealing strips and the bolt and clip members.

Figure 11 is a fragmentary end view of the wall shown in Figure 10 with sectional view of the angle-box, as well as the exhausting manifold.

Figure 12 shows, in fragmentary plan view, the T's and tubes with which the exhausting manifold, shown in Figure 11, is made up.

Like characters designate corresponding parts throughout the several views.

Figure 1:
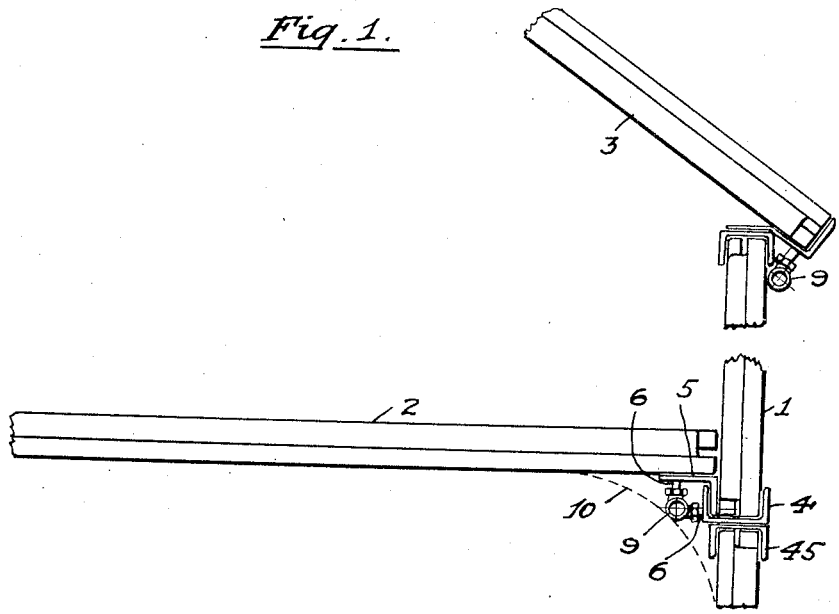
Figure 1 is a fragmentary end section of a building in elevation, showing a portion of the foundation wall, side wall, floor members and roof members.
Figure 1:
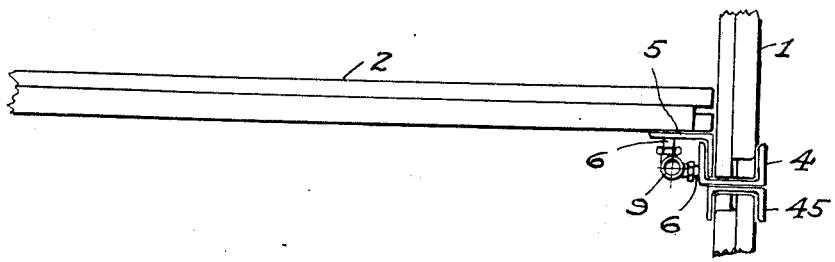
Figure 1:
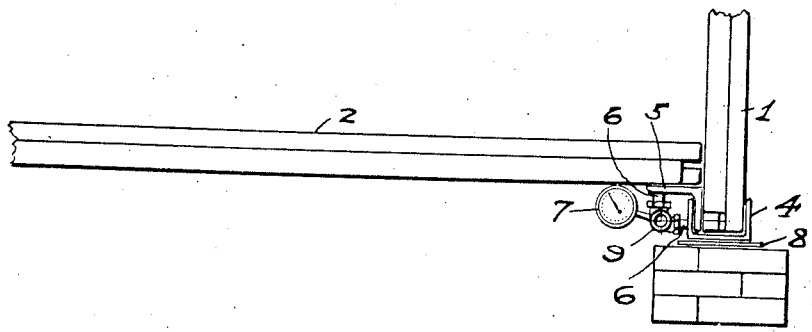

Figure 1 is an outline sketch, showing wall slabs 1, floors 2, and roof members 3, of a portion of a building constructed with vacuum slabs. In this view the bottom of each row of wall slabs is enclosed in a channel 4, which is large enough to admit the leg of an angle 5, the other leg of which angle forms the support of the floor members. It is obvious that a special shaped channel could be rolled, which would combine with it an angle leg, and thus require but one bar instead of two. The floor members may be covered with wood flooring or any material suitable. The floor members thus serve a double purpose in that they are a part of the building and hold the walls true and firm, besides carrying the floor covering with its burden.

6 shows the exhausting duct, described later.

A dial vacuum gauge will be noted at 7. A gauge of this sort, while not sensitive enough to show a true vacuum, is quite satisfactory for the purpose as here used.

Figure 2 is another outline sketch of a portion of a building, in this case quite a large building, showing center partition wall 1, with floor members 2 running to right and to left.

It will be noted, in this case, that the floor members 2 rest on a plate 3, which also carries the wall sections 1. This construction brings the joint between the upper and lower stories at the ceiling line, instead of below the ceiling line, as is the case in Figure 1, but in both cases the ducts 6 and the manifolds 9 and 11 are concealed in a large fillet at the ceiling line as shown at 10 in Figures 1 and 2, as it is quite obvious that the ducts and manifolds would not be very ornamental in a residence.

It will be seen that in Figure 1 the ducts 6, (through which the air is exhausted), serving the floor slabs 2, are connected in a manifold 9 which also serves the slabs 1 in the wall. This can be done, or each separate section, or each slab, for that matter, can be served with a duct running to the basement, depending on conditions. The flexiblity of the duct principle permits of this.

In this description, a duct is a single tube through which a slab is exhausted, or which connects two slabs. When two or more ducts are connected in a tube or pipe, common to both, that tube then becomes a manifold.

In case the manifold stands out and away from the wall, it takes the number 9, as in Figure 1, and when the manifold is enclosed within the wall, as in Figure 2, it takes the number 11.

Figure 3 shows a partition wall 1, between an existing floor and an existing ceiling, in case it is desired to make two rooms out of one, or for any other reason. It will be seen that the manifold 11 is entirely out of the way, within the wall 1. It can be led from the side of the room to the basement, or it can be connected to one of the existing manifolds, or if this is not practical for any reason, it can be connected to one of the floor slabs and be exhausted through the duct in that slab.

Figure 4 shows in detail one of the slabs 1, shown in place in Figure 1. The separators 12 will be noted in dotted lines, both in this view and in Figure 5. One form of clip will be noted at 13, which is welded to the slab and forms a means of attaching veneer or other covering.

Figure 6 is a cross section on line 6—6 of Figure 4 and shows in detail the construction of the slab, and in particular, the overlapped joint, 14 showing how the parts of the slab are joined together. This view also shows the separators 12 and the method of nesting them together in a grillage.

Figure 7 shows in detail the construction of one of the slabs shown in place in Figures 2 and 3 and is a fragmentary elevation. Figure 8 is an edge view of Figure 7, while Figure 9 is a cross section on line 9—9 in Figure 7 and shows very clearly how the edges of the bowl section are beaded over the lid part of the slab at 15. The beads are then either welded or soldered as shown at 16, or I may enclose a strip of packing in the bead, depending on the size of the slab or the kind and the thickness of the stock, or the purpose for which the slab is to be used.

The slabs may be made in several different forms. I have already shown two and have indicated some of their points of virtue.

Figure 10 shows in plan, fractional slabs shown in detail in Figures 7, 8, and 9 assembled in a wall. Rubber tubing sealing strips 23 will be noted. I do not wish to confine myself to this material for sealing strips, however, as I may use a braided construction, similar to that used in electrical conduit work, which may or may not have a resilient core, or I may use twisted and treated cordage.

For the sealing strips are really only operative until the assembly of the slabs into walls, etc., and the insertion or the pouring of the real sealing material, such as melted resin, which fills the intersections between the slabs, as well as the voids in the angle or the channel boxes, both at top of slabs as well as the bottom and entirely encloses the manifold, duct or the ducts within the wall.

A duct 6 may be provided for each slab, or several slabs may be connected in one series, thus each side wall, each floor, or each ceiling may be connected to one manifold, and each manifold, as well as each duct may be provided with a gauge 7, which will be a visible check at all times as to the degree and the extent of the vacuum in any part of the system.

Figure 11 shows a fragmentary end elevation of the slabs shown in Figure 10, and the manifold 11 with the T's 25. It will be noted that the weight of the slab is carried on the rounded bead, being the part of the slab best suited to serve as a column. However, once the sealing material is in place and thoroughly set, the whole will act as a unit.

The T's 25 are provided with accurately ground pin, or nipple sections 26 which connect with the forgings 27. These forgings are attached to the slabs by welding or riveting, or by any approved method, the bores of which are accurately ground and are held to exact limits, thereby making a tight joint between the pin 26 and forging 27. Naturally, each pin and each forging is treated, at the time of assembly into walls, with whitelead or other approved lubricant, which will also act as an additional seal.

The manifold 11 is assembled and tested for vacuum tightness before being placed in the angle or channel boxes, with the T's 25, shown in Figure 12, accurately spaced as to center distances of the wall slabs.

The bolt 28 and clips 29 shown in Figure 10 are used to compress the sealing strips 23 in order to bring the slabs to the same center to center distances to which the T's 25 are placed.

The manifold 11 with T's 25 presents an entirely straight bore, and without obstructions for the free exhaust of the entrapped air. However, I do not confine myself to the one form of T, but show others, later on. Neither do I confine myself to the bolt and clip method of adjusting and holding the upper ends of the slabs to their center to center distances, but may use hooks which fit into eyes, or any accepted method, without departing from the spirit of my invention.

As can be seen in Figure 11, while the slab 1 itself does not come down to the leg of the angle 30, the manifold 11 comes past the angle and rests on the connecting plate 8, shown in Figure 2, to which the two angles 30, forming the angle-box, (which takes the place of the channel 4 in Figure 1), are bolted. Thus there is a vacuum surface from the connecting plate 8 upward, counting the manifold 11, which gives complete insulation. Filler strips 31 are placed on the inside of the angle-box, upon which the slabs 1—1 rest. These are really distance pieces and determine the position of rest between pin 26 and forging 27, as well as taking the weight of the slabs 1—1.

In Figure 3 the angles 30 are fastened directly to the floor slabs 2 by the clips 21, 22, or 23, the floor slabs 2 themselves forming the connecting plate in this instance.

Naturally, all slabs are treated with a film of good rust-resisting paint after completion and before being assembled in a wall or building, and also naturally, each slab is tested for vacuum-tightness before the preserving covering is applied.

While I have herein described and shown a preferred embodiment of my invention, it will be readily understood by those skilled in the art that the same may be modified in various ways to meet any particular or peculiar requirement, without departing from the spirit of my invention.

Having thus described my said invention, what

I claim and desire to secure by Letters Patent of the United States is:

1. In a building, a wall comprising a plurality of hollow units disposed vertically in side by side relation to each other and being of a thickness corresponding to the thickness of the wall, end faces of the units being inclined and extending diagonally in the direction of the thickness of the wall, the end faces of adjacent units being inclined in opposite directions and cooperating with each other to provide channels extending longitudinally of the wall, exhaust pipes extending longitudinally in the channels, and pipes extending through the end walls of said units and connected with said exhaust pipes whereby air may be withdrawn from all of the units.

2. In a building, a wall comprising a plurality of hollow units disposed vertically and each extending the full heighth of a room and being of a thickness corresponding to the thickness of the wall, end faces of the units being bevelled and extending diagonally in the direction of the thickness of the wall, adjacent units having their end faces bevelled in opposite directions and cooperating with each other to provide channels extending longitudinally of the wall, exhaust pipes extending longitudinally in the channels, channeled members extending longitudinally of the wall and receiving end portions of said units with side flanges of the channeled members overlying side faces of the units and serving as reinforcements for upper and lower portions of the wall, and pipes extending through end walls of said units and connected with said exhaust pipes whereby air may be withdrawn from all the units.

3. In a building, a wall comprising a plurality of hollow units disposed vertically and each extending the full heighth of a room and being of a thickness corresponding to the thickness of the wall, end faces of the units being bevelled and extending diagonally in the direction of the thickness of the wall, adjacent units having their end faces bevelled in opposite directions and cooperating with each other to provide channels extending longitudinally of the wall, exhaust pipes extending longitudinally in the channels, channeled members extending longitudinally of the wall and receiving end portions of said units with side flanges of the channeled members overlying side faces of the units and serving as reinforcements for upper and lower portions of the wall plates bearing against said channeled members and projecting from opposite sides of the wall, hollow floor and ceiling units resting upon projecting portions of said plates and supported thereby, other exhaust pipes, and pipes extending through walls of said units and connected with said exhaust pipes whereby air may be withdrawn from all of the units.

4. In a building, a wall comprising a plurality of hollow units disposed vertically and being of a thickness corresponding to the thickness of the wall, end faces of the units extending diagonally in the direction of the thickness of the wall and the end faces of each unit extending at an opposite incline to the end faces of adjoining units and cooperating therewith to provide channels extending longitudinally of upper and lower ends of the wall, exhaust pipes in said channels, channeled members extending longitudinally of the wall with portions overlying side faces of the wall and other portions overlying the channels at opposite sides of the exhaust pipes, and pipes extending through walls of the units into said channels and connected with said exhaust pipes whereby air may be withdrawn from all of the units.

5. In a building, a wall comprising a plurality of vertically disposed hollow units, each unit corresponding to the thickness of the wall, upper and lower end faces of the units being shaped to define channels along upper and lower ends of the wall, packing between confronting side edge faces of said units, means for maintaining said units in close proximity to each other with said packing compressed to form tight joints between the same, exhaust pipes extending longitudinally in certain of said channels and pipes extending through walls of said units and connected with said exhaust pipes whereby air may be withdrawn from all of the units.

6. In a building, a wall comprising a plurality of vertically disposed hollow units, each unit corresponding to the thickness of the wall, upper and lower end faces of the units being shaped to define channels along upper and lower ends of the wall, packing between confronting side edge faces of said units, means for maintaining said units in close proximity to each other with said packing compressed to form tight joints between the same, exhaust pipes extending longitudinally in certain of said channels, channeled members extending longitudinally of upper and lower ends of said wall in straddling relation thereto to reinforce the wall and hold the units in alignment with each other and bear against a support, packings between said channeled members and ends of said units, and pipes extending through walls of said units and connected with said exhaust pipes whereby air may be withdrawn from all of the units.

CHARLES J. VAN BUREN.